US006553223B1

(12) United States Patent
Bayley et al.

(10) Patent No.: US 6,553,223 B1
(45) Date of Patent: Apr. 22, 2003

(54) VIRTUAL DEVICE ARCHITECTURE FOR MOBILE TELEPHONES

(75) Inventors: Gwain Bayley, Carlsbad, CA (US); Guanming Shi, San Diego, CA (US); Richard Higgins, San Diego, CA (US); Albert Scott Ludwin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/475,335

(22) Filed: Dec. 30, 1999

(51) Int. Cl.$^7$ ................................................ H04M 3/00
(52) U.S. Cl. ...................... 455/419; 455/575; 455/550; 455/418
(58) Field of Search .................... 455/88, 550, 552, 455/556, 575, 403, 418, 419, 420; 710/8, 9, 11, 10; 709/323

(56) References Cited

U.S. PATENT DOCUMENTS

| | | | | |
|---|---|---|---|---|
| 5,269,021 A | | 12/1993 | Denio et al. ................ | 395/700 |
| 5,623,498 A | * | 4/1997 | Pannone ..................... | 714/712 |
| 5,644,782 A | * | 7/1997 | Yeates ........................ | 710/10 |
| 5,745,762 A | * | 4/1998 | Celi, Jr. et al. ............ | 709/323 |
| 6,003,097 A | * | 12/1999 | Richman ..................... | 710/8 |
| 6,292,855 B1 | * | 9/2001 | Johnson et al. ............. | 710/33 |
| 6,307,559 B1 | * | 10/2001 | Hancock et al. ............ | 345/619 |

FOREIGN PATENT DOCUMENTS

| | | |
|---|---|---|
| EP | 0 442 676 A2 | 9/1991 |
| WO | WO 98/43174 | 10/1998 |

\* cited by examiner

*Primary Examiner*—Vivian Chin
*Assistant Examiner*—John J Lee
(74) *Attorney, Agent, or Firm*—Philip Wadsworth; Charles Brown; Kevin Cheatham

(57) ABSTRACT

The virtual device architecture provides physical and logical device drivers for interfacing software programs executing on a microprocessor of the mobile telephone of a wireless communication system with any of a wide variety of hardware devices connectable within the mobile telephone. The logical device drivers convert commands received from the software applications to commands appropriate for use by selected hardware devices. The physical device drivers receive the converted commands from the logical device drivers and in response to the received commands directly control the selected hardware devices. In one example described herein, the logical device drivers provide translation of core commands necessary to control the selected hardware devices and extended commands for enhanced control of the hardware devices. The logical device drivers operate to convert the extended commands into core commands prior to forwarding the commands to the physical device drivers. By providing logical and physical drivers for use with peripheral devices, the need to provide different versions of software executing on the microprocessor to accommodate different types of peripheral devices is substantially eliminated resulting in a considerable reduction in time and cost associated with developing, maintaining and upgrading software. By providing logical device drivers capable of accommodating both core commands and extended commands, a rich set of peripheral commands can be accommodated thereby further reducing or eliminating the need to provide different versions of software executing on the processor, while nevertheless exploiting the full capabilities of a wide variety of peripheral devices, including state of the art hardware devices such as bit-mapped displays, pointer devices and the like. Method and apparatus embodiments are described.

5 Claims, 2 Drawing Sheets

VIRTUAL DEVICE ARCHITECTURE FOR MOBILE TELEPHONES

BACKGROUND OF THE INVENTION

I. Field of the Invention

The invention generally relates to mobile stations used in mobile communication systems and in particular to a virtual device architecture for use in mobile station.

II. Description of the Related Art

Cellular telephones or other mobile stations for use within mobile communication systems typically include one or more processors which control a variety of peripheral components such as a keypad, character display, radio frequency (RF) transceiver and the like. In use, software executing on the processors operate to control the various peripheral devices to, for example, initiate a wireless telephone call. In this regard, the processor monitors the keypad to detect entry of keystrokes representative of a telephone number to be dialed and simultaneously displays the number using the character-based display. Once the number has been entered, and a keypad SEND command is entered, the processors controls other components, such as the RF transceiver, to initiate the telephone call by transmitting appropriate signals to a base station, including signals representative of the telephone number being dialed.

Preferably, the processors are capable of controlling a wide variety of peripheral components including various specific models of components. For example, the processors are preferably capable of controlling specific models of character-based displays and/or specific models of bit mapped-based displays. By permitting the processors to control a wide variety of different peripheral equipment, a manufacturer can design and manufacture a variety of cellular telephone models each having different combinations of peripheral components to appeal to different customers or to satisfy different needs. For example, one cellular telephone may include a state of the art bit-mapped display, a keypad with a large number of keys, and a pointing device such as a touch sensitive screen. Another, less expensive, cellular telephone may include only a small character-based display along with a rudimentary 12-key keypad.

Although it is desirable to provide processors capable of controlling a wide variety of peripheral equipments, a problem arises because different peripheral components use different command signals from one another. As a result, typically, a different version of the software executing on the processor may need to be provided for each different combination of peripheral components. Thus, one version of the processor software is created for use with a character-based display whereas another is created for use with a bit mapped-based display. Depending upon the particulars of the various displays, different versions of the software may be required for displays provided by different manufacturers and may also be required for different display models provided by a single manufacturer. As can be appreciated, given the wide variety of different peripheral components available for use within a mobile station and given the large variations based upon manufacturer or model number, numerous different versions of the processor software are required. Hence, the time and cost required to develop, maintain and upgrade the software can become considerable, resulting in higher costs to the consumer and perhaps delaying the development of new mobile station products.

The aforementioned problems are particularly significant for "smart phones", i.e. wireless telephones capable of numerous additional functions beyond those of wireless telephony—such as personal digital assistant (PDA) functions and the like. Smart phones typically require many more peripheral hardware components than conventional wireless telephones thereby exacerbating the problems associated with developing software capable of controlling the peripheral hardware components.

Accordingly, it would be highly desirable to implement a virtual device architecture within a mobile station, particularly a smart phone, to permit software executing on processors of the mobile station to interface with any of a variety of different peripheral components via a set of virtual device drivers and it is to that end that aspects of the present invention are directed. Another aspect of the invention is directed to providing abstract physical device control from high level logical commands.

It would also be desirable to provide a virtual device architecture which provides a rich set of commands to fully exploit capabilities of state-of-the-art devices for use in mobile stations, again particularly smart phones, such as mapped-based display devices and pointer devices, and devices unique to wireless mobile stations such as RF transmitters.

SUMMARY OF THE INVENTION

In accordance with the invention, a system is provided for interfacing software executing on a processor of a mobile station of a wireless communication system with any of a plurality of hardware devices connectable within the mobile station. The system comprises a set of logical or virtual device drivers for converting commands received from the software applications to commands appropriate for use by selected hardware devices and physical device drivers for receiving the converted commands from the virtual device drivers and for directly controlling the selected hardware devices. By providing virtual and physical device drivers for use with peripherals, the need to provide different versions of software executing on the processors to accommodate different types of peripheral devices is substantially eliminated resulting in a considerable reduction in the time and cost associated with developing, maintaining and upgrading the software.

In an exemplary embodiment, the mobile station is a smart phone capable of performing mobile telephony functions and also capable of performing personal digital assistant (PDA) functions, such as calendaring, scheduling and the like. Two separate processors are provided, one directed to handling the mobile telephony functions and the other directed to handling the "PDA" functions. Alternatively, a single integrated processor is provided for handling both sets of functions. Software operating within the mobile station includes a device encapsulation layer, a standard/services encapsulation layer and a user applications encapsulation layer. The aforementioned logical and physical device drivers form part of the device encapsulation layer. More specifically, the device encapsulation layer includes a board support package (BSP) including numerous physical device drivers such as display drivers, RF transceiver drivers, and the like. Additional physical device drivers may also be provided separate from the BSP. The aforementioned logical device drivers form an interface between the physical device drivers and the standard/services encapsulation layer, which includes software providing call management, voice services, power management services and the like. The software of the standard/services encapsulation layer, in turn, provides an interface with any user applications such as a voice recognition software or other high level software functionality.

In the exemplary embodiment, the logical device drivers of the device encapsulation layer provide translation of core commands necessary to control the selected hardware devices and extended commands for enhanced control of the selected hardware devices. The logical device drivers operate to convert the extended commands into core commands prior to forwarding to the physical device drivers. Exemplary core commands include draw commands and area control commands for use with bit mapped-based display devices. Exemplary extended commands for use with bit mapped-based displays include commands directed to controlling the display area, resolution and color of the bit mapped-based display. Other extended commands include commands directed to controlling graphic objects, graphic icons and animation. By providing logical device drivers capable of accommodating both core commands and extended commands, a rich set of peripheral commands can be accommodated thereby reducing or eliminating the need to provide different versions of the software executing on the processor while nevertheless exploiting the capabilities of a wide variety of peripheral devices, including state-of-the-art hardware devices such as bit mapped-displays, pointer devices and the like.

Thus, by providing a virtual device architecture which accommodates both core commands and extended commands and which accommodates a large number of peripheral devices unique to mobile stations, including RF transceiver devices, the disadvantages described above are substantially overcome. Other objects, advantages and features of the invention will be apparent from the detailed description which follows in conjunction with the accompanying drawings.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENTS

Referring to the figures referred in exemplary embodiments of the invention above-described, the exemplary embodiments will be described with reference to a particular virtual device architecture implementation for use within a mobile telephone but principles of the invention are applicable to other virtual device architecture for use in other wireless communication devices.

Figure 1:
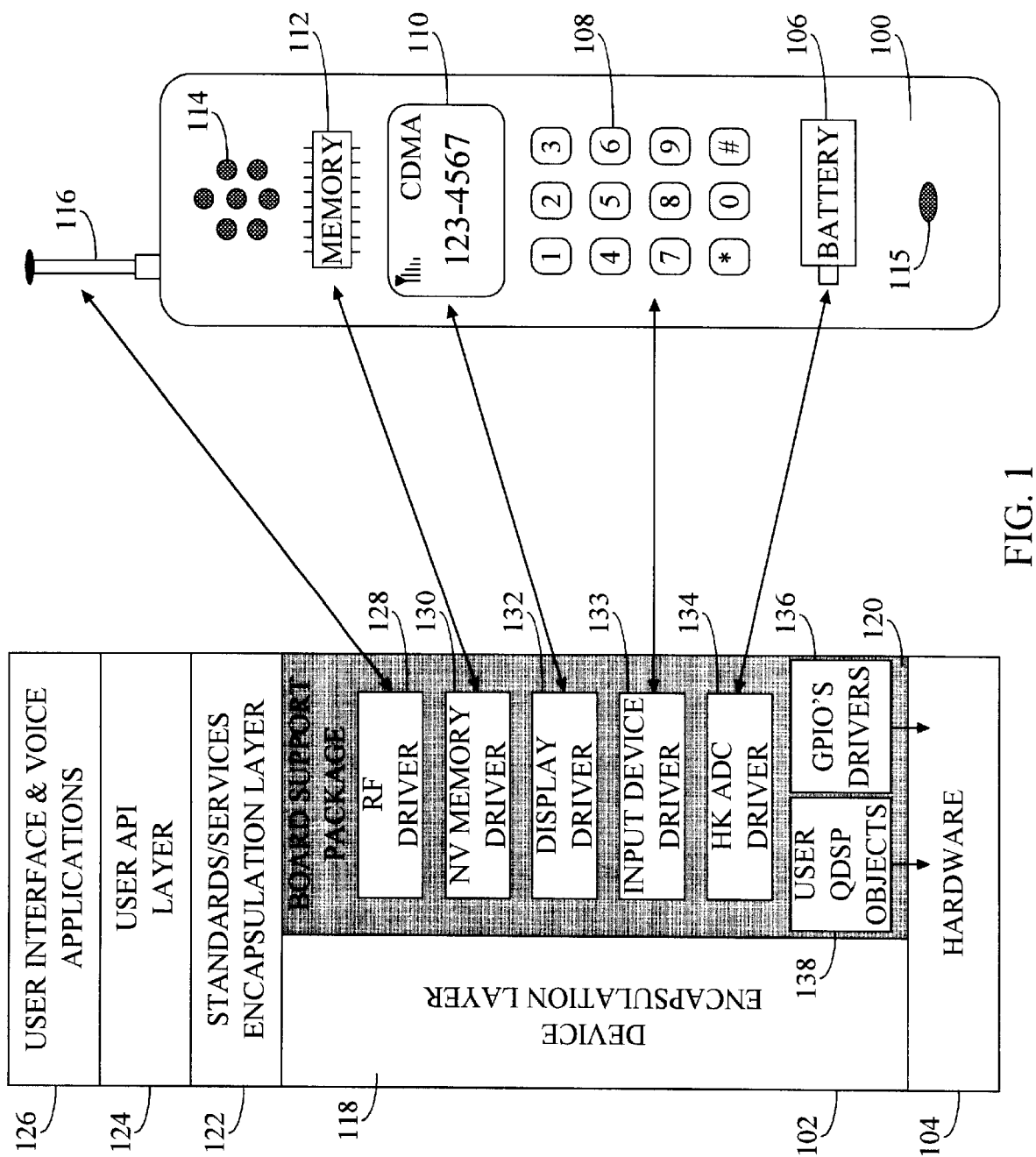
FIG. 1 is a block diagram illustrating a wireless telephone and further illustrating hardware and software components for use within the mobile telephone and particularly illustrating a virtual device architecture employed within the software.

FIG. 1 provides a functional illustration of a mobile station 100, such as a CDMA smart phone, and also provides a functional illustration of software and hardware components 102 operating within the mobile station. The hardware and software components include a hardware layer 104 (which may include or comprise a mobile station manager (MSM) application specific integrated circuit (ASIC)) and various peripheral components such as a battery 106, an alphanumeric keypad 108, a bit-mapped display device 110, a memory 112, speaker 114, and radio frequency (RF) transceiver 116. The hardware layer, although not specifically shown in FIG. 1, includes one or more programmable microprocessors. Depending upon the implementation, one microprocessor may be configured for handling mobile telephony functions whereas a separate microprocessor is provided for handling other functions such as PDA functions. Alternatively, a single ASIC may be provided which integrates the mobile telephony functions and all other functions.

Software running within the mcroprocessors of hardware layer 104 includes a device encapsulation layer 118 (including a board support package (BSP) 120), a standard/services encapsulation layer 122, a user API layer 124, and a user interface and voice application layer 126. The BSP includes specific physical device drivers for controlling the various peripheral hardware components external to the microprocessors including the aforementioned battery, keypad, memory, RF transceiver and the like. Each physical device driver includes software for translating signals received from the microprocessor for controlling the specific corresponding hardware device. The physical device drivers also include software for translating signals received from the hardware devices for input into the microprocessor. By providing a set of software device drivers which provide an interface between the microprocessor and the external peripheral devices, a variety of combinations of different peripheral components can be used without requiring significant modifications to other software components running on the microprocessor. Thus, for example, if the bit-mapped display 110 is switched to a character-based display, the corresponding physical device driver of the BSP is replaced with a driver specific to character-based displays without requiring substantial modification to any other software. By providing the BSP as the lowest layer of the software, the software application layers above it, such as the standard/services encapsulation layer, the user API layer, and the user interface and voice application layer, require minimal changes whenever a new peripheral device is introduced into the mobile station. The device architecture of FIG. 1 also enhances the portability, maintainability, extensibility, and the testability of the device driver software to reduce overall system development time and cost. The BSP provides a flexible architecture to allow easy development and integration of user applications, device driver software and hardware devices. The BSP also provides a framework that enforces modular design for device driver software development thus enhancing the aforementioned portability, maintainability, extensibility, and testability of the software modules. Additionally, the BSP provides a standard and extendable sets of API functions to permit firmware designers, particularly ASIC designers, to easily implement application software and install different device drivers, thus further reducing time and cost to market.

Now considering BSP 120 in greater detail, the BSP includes an RF driver 128 for controlling the RF transceiver 116, a nonvolatile memory driver 130 for controlling persistent memory 112, a display driver 132 for controlling bit-mapped display 110, an input device driver 133 for controlling keypad 108, a housekeeping analog-to-digital converter (HK ADC) driver 134 for monitoring battery 100 and other signals. The BSP also includes a set of general purpose input/output (GPIO) drivers 136 and a set of user digital signal processor (DSP) objects 138.

Figure 2:
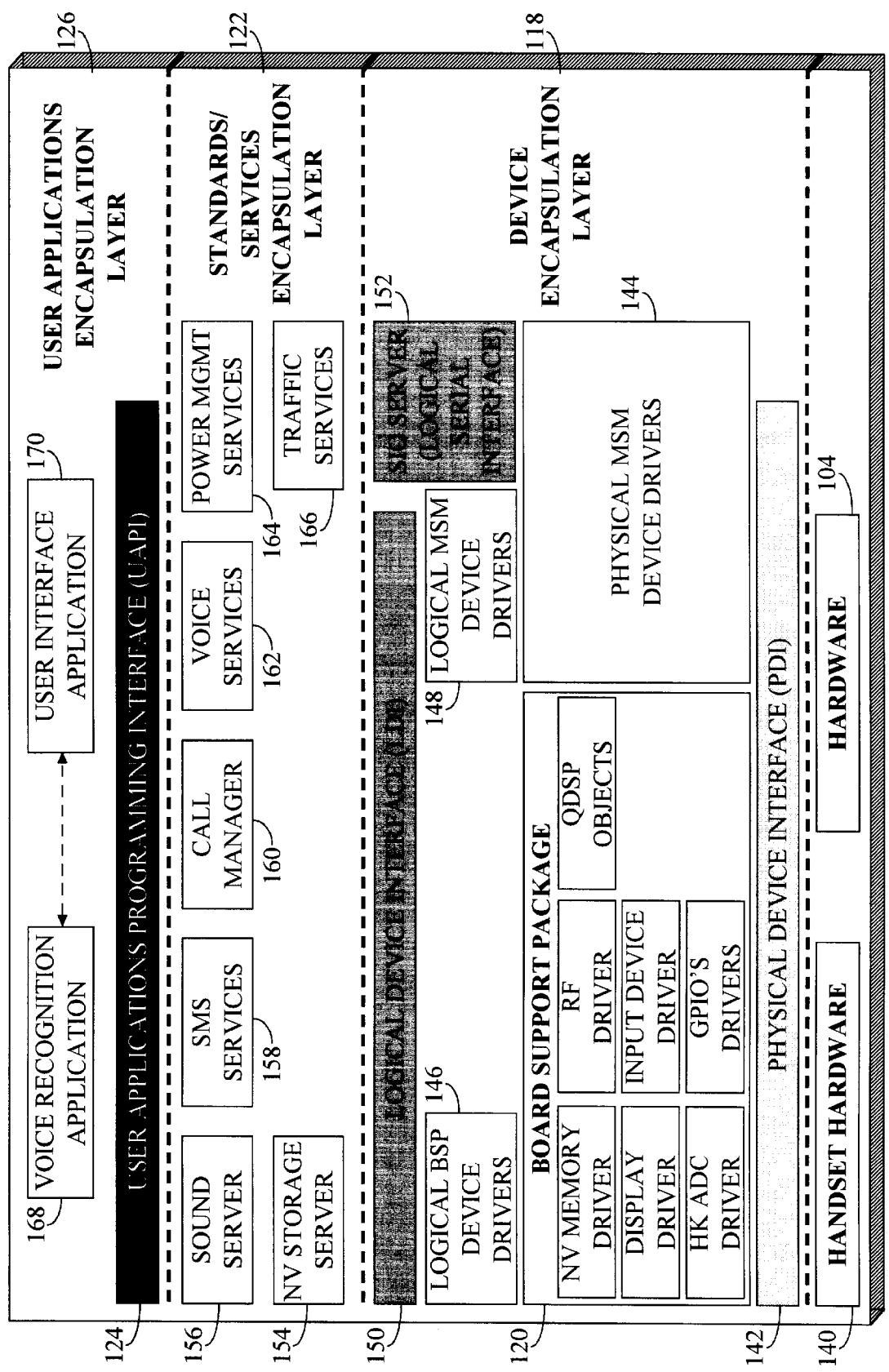
FIG. 2 is a block diagram illustrating the hardware and software of the mobile telephone of FIG. 1 and particularly illustrating the virtual device architecture in greater detail.

Further details regarding the various software layers are provided within FIG. 2. The various peripheral hardware components of FIG. 1 are identified as handset hardware 140 within FIG. 2 so as to be clearly distinguished from MSM ASIC hardware 104. A physical device interface (PDI) 142 exists between the hardware components and the various drivers of BSP 120. Additional physical device drivers 144 are provided within the device encapsulation layer for interfacing with the MSM ASIC through the PDI. The drivers of the BSP and the MSM ASIC device drivers are each connected through respective logical device drivers 146 and 148 to a logical device interface 150 which provides an interface between the device encapsulation layer and the standard/services encapsulation layer. Some MSM ASIC device drivers are connected directly to the traffic device of the standard/services encapsulation layer which communicates to external phone hardware via a serial input/output (SIO) server 152 which provides a logical serial interface.

Within the standard/services encapsulation layer 122, a variety of software packages are provided for controlling the hardware of the mobile station through the device encapsulation layer. More specifically, the standard/services encapsulation layer includes a nonvolatile storage server 154, a sound server 156, short message services (SMS) 158, a call manager 160, voice services 162 and power management services 164. Traffic services 166 are provided in connection with the SIO server of the device encapsulation layer. The nonvolatile storage server provides software for interfacing with any long term, nonvolatile memory devices provided within the mobile station such as devices provided to permanently store lists of telephone numbers, addresses and the like. The sound server provides software for interfacing with the speaker of the mobile station so as to control the speaker to generate various different sounds alerting the user to incoming phone calls and the like. Different sounds may be provided depending upon the type of incoming message. For example, one sound is provided for an incoming voice call whereas another sound is provided for an incoming paging message. A wide variety of additional sounds may be generated depending upon the functions performed by the mobile station including, for example, sounds appropriate to games and the like.

SMS services 158 provides software for handling short messages such as paging messages and the like. The call manager provides software for managing incoming and outgoing telephone calls including software provided to initiate a telephone call. Voice services provide software for processing the voice of the user of the mobile station as the user speaks into the mobile station to, for example, control various phone operations using rate commands and the like. The power management services provides software for minimizing the amount of power consumed by each of the various hardware components of the mobile station depending upon the particular hardware component and its current mode of operation. To this end, the power management services software operates to put various hardware components of the mobile station to sleep and to disconnect clock signals therefrom to reduce power consumption. As one specific example, the power management services software places the primary microprocessor of the mobile station asleep whenever its functions are not needed such as, for example, between paging slots within a CDMA system if no current wireless communication is in progress and if no other functions of the microprocessor are being used by the user. The traffic services software controls transmission of data between various hardware components of the mobile station along one or more buses.

Finally, within user applications encapsulation layer 126 are various software applications such as a voice recognition application 168 and- a user interface application 170 along with the aforementioned UAPI 124. The voice recognition application provides software for processing the voice of the user to recognize commands contained therein for the purposes of controlling the mobile station. As an example, the voice recognition software may detect and respond to commands such as Aturn on,@ Aturn off,@ Acall home,@ or Acall the office.@ The user interface application provides software for interfacing with the user including, for example, software for generating various input and output displays on the display screen of the mobile station, particularly sophisticated displays used in connection with PDA functions such as displays of calendars, schedules, and the like. Depending upon the input device of the mobile station, the user interface application software may additionally including handwriting recognition software for recognizing handwritten commands entered by user.

Thus, a wide variety of servers and other software are provided within the various layers for performing various functions. Typically, all of the software programs interface with one or more of the hardware devices via the logical device drivers of the BSP. To facilitate development of software, the device drivers of the BSP are programmed to recognize and respond to various generic high level commands applicable to a wide variety of types of devices. For example, the drivers are programmed to respond to a read command to input information from a corresponding physical device designated within the read command. Thus, if the read command designates a pointer device, the input device driver converts the generic read command to the specific command required for use with the specific pointer hardware device provided within the mobile station. If the read command specifies the keypad, the input device driver translates the read command into the specific appropriate command for use with the particular keypad hardware device configured within the mobile station. In this manner, software developers can use a set of generic commands without needing to specify hardware attributes.

Additionally, the logical device drivers of the device encapsulation layer 118 distinguish between core driver functions and extended driver functions. The core driver functions support basic features that allow a software application to interact with a hardware device. These functions transform the access request from the software applications to hardware specific requests and pass the request on to the physical device drivers. For example, a core display driver function is provided to allow a software application to dump a bit map to the screen. Extended driver functions provide a richer set of features or value-added services to the applications and are based upon the core driver functions. For example, an extended display driver function is provided to allow a software application to draw a graphic object such as an arc to the screen. This function translates the arc into a bit map and uses the corresponding core functions to output the bit map to the device. Hence, a software application designer need not write specific commands for drawing complex graphic objects on the display screen. Rather, the software designer need only invoke the extended driver command, thus enhancing the ease of software development.

Examples of various core and extended driver functions are as follows:

Core Keypad API Functions

Functions to support capability inquiry by an application. Capability report supplies the features of the keypad device and functions that the driver supports to the application.

Functions to generate a key event each time a key changes state, including a code identifying the key that was pressed or released. The key code is independent of any particular keypad arrangement to allow applications to handle a variety of keypads made by different manufacturers.

Functions to allow an application to subscribe to key event. The key event is the only reported to its subscribers.

Functions to allow an application to set the keypad to the normal or power saving mode if the device supports power saving mode. A keypad device can do polling or a combination of polling and interrupt. If the keypad has the interrupt capability, it uses interrupt in the power saving mode.

Functions to allow an application to lock or unlock the keypad.

When the keypad is locked, the keypad driver disables keypad interrupts and stops polling. When the keypad is unlocked, it resumes its normal operation.

Functions to allow an application to request the state of any key on the keypad or the state of the entire keypad.

Core Pointer API Functions

Functions to support capability inquiry by an application. Capability report supplies the features of the pointer device and functions that the driver supports to the application.

Functions to generate a pointer event each time the pointer device changes state. The event structure includes the current pointer cursor position, whether the pointer is moved, and whether the pointer is pressed or released. If the device contains more than one button, the event structure specifies which button is pressed or released.

Functions to allow a user application to subscribe to pointer event. The pointer event is only reported to its subscribers.

Functions to allow the user application to request the pointer position and status.

Core Common Display Functions

Functions to support capability inquiry by an application.

Capability report supplies the features of the display device and functions that the driver supports to the application. Examples include the type of display device: character based or bitmap based device, the size of the LCD screen in pixels or in characters, how many active annunciators, what functions are available, so on.

Functions to allow an application to turn on and off, and blink annunciators using annunciator codes. The annunciator codes are independent of any annunciator arrangements to allow the applications to handle different types and layouts of annunciators on the LCD. Allow the application to change the blink rate.

Functions to allow an application to request the state of the annunciators.

Functions to allow an application to set the device to any of the power saving modes that the device may support.

Functions to allow an application to turn on and off the display, and to blink the display at the application specified rate.

Functions to allow an application to turn and off the backlight.

Functions to allow an application to set the LCD display contrast if the feature is supported by the hardware.

Functions to allow an application to create/remove and activate/deactivate any of the display buffers that are supported by the device.

Functions to allow an application to display characters.

Functions to provide a standard set of ASCII codes and a standard set of UNICODE codes.

Functions to allow an application to select which set of codes to use.

Functions to allow an application to clear any part of the display.

Functions to report a snapshot of the display at the application=s request.

Core Character Based Display API Functions

Functions to allow an application to define its own characters and to select these characters for display if a LCD has the capability. Usually only a small number of user defined characters are allowed.

Core Bitmap Based Display API Functions

Functions to allow an application to draw a bitmap on the display. Based on the capabilities of the device, the application can overwrite a bitmap to an existing bitmap buffer or mix it with the existing bitmap in the buffer. For example, an AND operator capability would allow the application to take a logical AND of the corresponding bits in the bitmaps and produce a new bitmap.

Functions to allow an application to control a specific bitmapped area, to turn it on and off, and to blink it at the application specified rate.

Extended Bitmap Based Display API Functions

Functions to allow an application to define its own display area on the screen.

Functions to allow an application to change the resolution and/or color of display if supported by the hardware.

Functions to support system defined and user defined character fonts, color and style.

Functions to support basic graphic objects: pixel, line, arc, circle, rectangle, and triangle.

Functions to support system defined and user defined graphic icons.

Functions to support animation session. An animation session consists of a sequence of frames of text, basic objects and bit maps, and motion control of these frames.

The exemplary embodiments have been primarily described with reference to schematic diagrams illustrating pertinent features of the embodiments. It should be appreciated that not all components of a complete implementation of a practical system are necessarily illustrated or described in detail. Rather, only those components necessary for a thorough understanding of the invention have been illustrated and described. Actual implementations may contain more components or, depending upon the implementation, fewer components. The description of the exemplary embodiments is provided to enable any person skilled in the art to make or use the present invention. Various modifications to these embodiments will be readily apparent to those skilled in the art and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. In a mobile station of wireless communications system, a system for interfacing software executing on a processor of the mobile station with any of a plurality of hardware devices mountable within the mobile station, said system comprising:

logical device drivers for converting generic high level commands received from the software applications to commands appropriate for use by selected hardware devices of the plurality of hardware devices, said logical device drivers providing translation of core commands necessary to control the selected hardware devices and providing translation of extended commands for enhanced control of the selected hardware devices, said extended commands being first converted into core commands;

physical device drivers for receiving the converted commands from the logical device drivers and for directly controlling the selected hardware devices;

wherein said generic high level commands are selected from a group including keypad commands, pointer commands, common display commands, character-based display commands, bitmapped based display commands, non-volatile memory device commands, user QDSP commands, ADC commands, and GPIO commands; and wherein said keypad commands include core commands selected from a group including keypad event detection commands, keypad event subscription commands, keypad power save commands, keypad lock commands, and keypad status commands.

2. In a mobile station of wireless communications system, a system for interfacing software executing on a processor of the mobile station with any of a plurality of hardware devices mountable within the mobile station, said system comprising:

logical device drivers for converting generic high level commands received from the software applications to commands appropriate for use by selected hardware devices of the plurality of hardware devices, said logical device drivers providing translation of core commands necessary to control the selected hardware devices and providing translation of extended commands for enhanced control of the selected hardware devices, said extended commands being first converted into core commands;

physical device drivers for receiving the converted commands from the logical device drivers and for directly controlling the selected hardware devices;

wherein said generic high level commands are selected from a group including keypad commands, pointer commands, common display commands, character-based display commands, bitmapped based display commands, non-volatile memory device commands, user QDSP commands, ADC commands, and GPIO commands; and wherein said pointer commands include core commands selected from a group including pointer event detection commands, pointer event subscription commands, pointer power save commands, and pointer status commands.

3. In a mobile station of wireless communications system, a system for interfacing software executing on a processor of the mobile station with any of a plurality of hardware devices mountable within the mobile station, said system comprising:

logical device drivers for converting generic high level commands received from the software applications to commands appropriate for use by selected hardware devices of the plurality of hardware devices, said logical device drivers providing translation of core commands necessary to control the selected hardware devices and providing translation of extended commands for enhanced control of the selected hardware devices, said extended commands being first converted into core commands;

physical device drivers for receiving the converted commands from the logical device drivers and for directly controlling the selected hardware devices;

wherein said generic high level commands are selected from a group including keypad commands, pointer commands, common display commands, character-based display commands, bitmapped based display commands, non-volatile memory device commands, user QDSP commands, ADC commands, and GPIO commands; and wherein said common display commands include core commands selected from a group including annunciator commands, annunciator status commands, display power save commands, display activation commands, back light activation commands, display contrast commands, display buffer commands, character display commands, ASCII commands, UNICODE commands, code selection commands, clear display commands, and snapshot report commands.

4. In a mobile station of wireless communications system, a system for interfacing software executing on a processor of the mobile station with any of a plurality of hardware devices mountable within the mobile station, said system comprising:

logical device drivers for converting generic high level commands received from the software applications to commands appropriate for use by selected hardware devices of the plurality of hardware devices, said logical device drivers providing translation of core commands necessary to control the selected hardware devices and providing translation of extended commands for enhanced control of the selected hardware devices, said extended commands being first converted into core commands;

physical device drivers for receiving the converted commands from the logical device drivers and for directly controlling the selected hardware devices;

wherein said generic high level commands are selected from a group including keypad commands, pointer commands, common display commands, character-based display commands, bitmapped based display commands, non-volatile memory device commands, user QDSP commands, ADC commands, and GPIO commands; and wherein said character-based display commands include user-defined character selection commands.

5. In a mobile station of wireless communications system, a system for interfacing software executing on a processor of the mobile station with any of a plurality of hardware devices mountable within the mobile station, said system comprising:

logical device drivers for converting generic high level commands received from the software applications to commands appropriate for use by selected hardware devices of the plurality of hardware devices, said logical device drivers providing translation of core commands necessary to control the selected hardware devices and providing translation of extended commands for enhanced control of the selected hardware devices, said extended commands being first converted into core commands;

physical device drivers for receiving the converted commands from the logical device drivers and for directly controlling the selected hardware devices;

wherein said generic high level commands are selected from a group including keypad commands, pointer commands, common display commands, character-based display commands, bitmapped based display commands, non-volatile memory device commands, user QDSP commands, ADC commands, and GPIO commands; and wherein said bitmap-based display commands include core commands selected from a group including bitmap draw commands and bitmap area control commands and extended commands selected from a group including display area definition commands, resolution commands, display color commands, character font, display and color commands, graphic object commands, graphic icon commands, and animation commands.

* * * * *